US010333858B2

(12) United States Patent
Gouache et al.

(10) Patent No.: US 10,333,858 B2
(45) Date of Patent: Jun. 25, 2019

(54) METHOD FOR CONTROLLING BANDWIDTH AND CORRESPONDING DEVICE (75) Inventors: Stephane Gouache, Cesson-Sevigne (FR); Remi Houdaille, Cesson-Sevigne (FR)

(73) Assignee: INTERDIGITAL MADISON PATENT HOLDINGS, Paris (FR)

(*) Notice: Subject to any disclaimer, the term of this patent is extended or adjusted under 35 U.S.C. 154(b) by 32 days.

(21) Appl. No.: 14/346,719

(22) PCT Filed: Aug. 30, 2012

(86) PCT No.: PCT/EP2012/066801
§ 371 (c)(1),
(2), (4) Date: Mar. 22, 2014

(87) PCT Pub. No.: WO2013/045195
PCT Pub. Date: Apr. 4, 2013

(65) Prior Publication Data
US 2014/0250231 A1    Sep. 4, 2014

(30) Foreign Application Priority Data
Sep. 26, 2011    (EP) ................... 11306221

(51) Int. Cl.
*G06F 15/173* (2006.01)
*H04L 12/911* (2013.01)
*H04L 29/06* (2006.01)

(52) U.S. Cl.
CPC .......... *H04L 47/70* (2013.01); *H04L 65/1026* (2013.01); *H04L 65/4092* (2013.01); *H04L 65/608* (2013.01); *H04L 65/80* (2013.01)

(58) Field of Classification Search
CPC ... H04L 65/608; H04L 47/70; H04L 65/4048; H04L 65/60; H04L 47/38; H04L 65/1026; H04L 65/4092; H04L 65/80
See application file for complete search history.

(56) References Cited

U.S. PATENT DOCUMENTS 6,044,396 A    3/2000  Adams
7,136,353 B2   11/2006 Ha et al.
(Continued)

FOREIGN PATENT DOCUMENTS

EP    2573997       3/2013
JP    2009246630    10/2009
(Continued)

OTHER PUBLICATIONS

Pantos R et al:"HTTP Live streaming; draft-pantos-htpp-live-streaming-06.txt", (ISOC) 4, Rue des Falaises CH-1205 Geneva, Switzerland, n°6, Apr. 1, 2011 (Apr. 1, 2011), pp. 1-24.
(Continued)

*Primary Examiner* — Suraj M Joshi
*Assistant Examiner* — Ayele Woldemariam
(74) *Attorney, Agent, or Firm* — Joseph J. Opalach (57) ABSTRACT The present invention concerns a device and a method at the device, the device comprising a first interface to a first network comprising an adaptive streaming server, a second interface to a second network comprising at least one adaptive streaming client device, a stream identifier for detecting at least one streaming content requested by the at least one adaptive streaming client device, the at least one streaming content being available at more than one data rate, a bandwidth manager for selecting a data rate among the more than one data rate, a scheduler for transmitting at the second interface the at least one streaming content to the at least one client device at a data rate above said selected data
(Continued)

rate but below any higher data rate available for said streaming content.

9 Claims, 4 Drawing Sheets

(56) References Cited

U.S. PATENT DOCUMENTS

| | | | |
|---|---|---|---|
| 7,675,926 B2 | 3/2010 | Olsen et al. | |
| 2004/0057420 A1* | 3/2004 | Curcio | H04L 12/5695 370/352 |
| 2008/0072264 A1* | 3/2008 | Crayford | H04L 29/06027 709/231 |
| 2009/0067328 A1 | 3/2009 | Morris et al. | |
| 2009/0164653 A1* | 6/2009 | Mandyam | H04L 65/601 709/231 |
| 2010/0017836 A1 | 1/2010 | Trojer | |
| 2011/0107379 A1* | 5/2011 | Lajoie | H04L 65/1016 709/231 |
| 2011/0270913 A1* | 11/2011 | Jarnikov | H04N 21/23439 709/203 |
| 2012/0017282 A1* | 1/2012 | Kang | G06F 21/10 726/26 |

FOREIGN PATENT DOCUMENTS

| | | |
|---|---|---|
| RU | 2370907 | 1/2004 |
| RU | 2354068 | 4/2005 |
| WO | WO2004064300 | 7/2004 |
| WO | WO2005107216 | 11/2005 |
| WO | WO2011109101 | 9/2011 |

OTHER PUBLICATIONS

Search Report dated Mar. 5, 2013.
Jung, et aL: "Design and Performance Evaluation of In-Home High Throughput Streaming Service With Ethernet and IEEE1394", Sch. of Electr. Eng. & Comput. Sci., Kyungpook Nat. Univ., DaeguIEEE Transactions on Consumer Electronics IEEE, Nov. 2009.
Alex Zambelli, "The Birth of Smooth Streaming", Microsoft Media Blog, Posted on Feb. 4, 2009.
TS 26.234 (3GPP specification)"Transparent end-to-end Packet-switched Streaming Service (PSS); Protocols and codecs", The Mobile Broadband Standard, Apr. 2, 2016.
Saamer Akhshabi, et al., "An Experimental Evaluation of Rate Adaptation Algorithms in Adaptive Streaming over HTTP," ACM Multimedia Systems Conference 2011, Feb. 24, 2011, San Jose, United States.
Bert Hubert, et al. "Linux Advanced Routing & Traffic Control HOWTO," Technical guide to Linux IP tables, 2002.
Luca De Cicco and Saverio Mascolo, "An Experimental Investigation of the Akamai Adaptive Video Streaming," Proc of USAB 2010, special session Interactive Multimedia Applications (WIMA), Nov. 3-4, 2010, pp. 447-464, Klagenfurt, Austria.
Remi Houdaille, et al., "Bandwidth Management Use Cases" Connected Home WP3 internal document, 2011.
Remi Houdaille et al, "Shaping HTTP adaptive streams for a better user experience" Conférence ACM MMSYS 2012.

* cited by examiner

METHOD FOR CONTROLLING BANDWIDTH AND CORRESPONDING DEVICE

This application claims the benefit, under 35 U.S.C. §365 of International Application PCT/EP2012/066801, filed Aug. 30, 2012, which was published in accordance with PCT Article 21(2) on Apr. 4, 2013 in English and which claims the benefit of European patent application No. 11306221.0, filed Sep. 26, 2011.

FIELD OF THE INVENTION

The present invention relates generally to video streaming content distribution and in particular to controlling bandwidth used by video streaming content.

BACKGROUND OF THE INVENTION

This section is intended to introduce the reader to various aspects of art, which may be related to various aspects of the present invention that are described and/or claimed below. This discussion is believed to be helpful in providing the reader with background information to facilitate a better understanding of the various aspects of the present invention. Accordingly, it should be understood that these statements are to be read in this light, and not as admissions of prior art.

Media delivery streaming solutions are mainly based on protocols such as Real time streaming Protocol (RTSP) as defined in the IETF RFC 2326, Microsoft Media Server (MMS) proprietary protocol from Microsoft or Real Time Messaging Protocol (RTMP) proprietary protocol from Adobe Systems.

Streaming techniques based on the HTTP protocol have emerged, to allow delivery of content over the Internet. These techniques allow a client device to receive video in the form of small successive small segments, called chunk, and being a few seconds long. Each segment is requested through the HTTP protocol and may exist in different variants, allowing the client device to choose at any time an appropriate bit-rate matching the network and its own constraints. Different bit rates correspond to different quality levels of the delivered content. As soon as the network bandwidth measured by the client device decreases, it requests chunks which are less restrictive with respect to network bandwidth requirement. When the network bandwidth measured by the client device increases, it requests chunks which are more restrictive with respect to network bandwidth requirement.

The available chunks are generally listed in a playlist generated and provided by the streaming server. The playlist can point to other playlists such as one per type of format. Playlists describe the chunk content, such as the codec or the required bandwidth for downloading it, and the way to request them. The playlist format can be the one described in the document "HTTP Live Streaming draft, pantos, http-live-streaming, 06", extended with codec information to describe the various SVC layers.

Various HTTP streaming techniques are available. Apple HTTP Live Streaming (HLS) was published as a draft RFC, and is used mainly on Apple devices. Microsoft Smooth Streaming is part of the Microsoft Silverlight platform, and specifications are publicly available. Adobe Open Source Media Framework (OSMF) is close to the Microsoft solution. 3GPP has released specifications for a Packet Switched Streaming (PSS) system; An MPEG working group was also created around the definition of Dynamic Adaptive Streaming over HTTP (DASH). The benefit of using the HTTP protocol in these streaming solutions is its capability to cross over NAT and firewall seamlessly. These HTTP streaming technologies provide a way to compensate erratic network behavior regarding available bandwidth by continuously and gracefully upgrading or downgrading the video quality in order to fit with the bandwidth constraint.

In general HTTP streaming techniques are based on the same concept. They vary in the playlist file formats, the meta-data provided to describe the content options (bitrate, image dimensions, frame rate . . . ), the organisation of the available representations of the content in segments, in the codecs supported, and in the content protection technologies.

When a client device wants to play some audio/video content, it first has to get a file describing how this specific content can be obtained.

This is done through HTTP by getting some 'file' from an URL. This file basically lists the available representations of the content (in terms of bitrate and other properties) and for each one the URLs that enable loading the content segments for each time slice. For example for a Video on Demand content the entire description of the movie is provided, while for live broadcast content the description covers only a short period of time and needs to be reloaded periodically to discover the new items when time passes.

Depending on its capabilities and the knowledge it has from the network environment, the client device selects some representation (typically based on its bit-rate) and loads the first segment(s) of content. It buffers a few segments to be able to cope with network impediments. Then the content from each received segments are played one after the other. At the same time, the client device measures the reception rate and may decide to go to higher or lower bitrate. In such case, it just requests the next segment(s) from another representation. Every HTTP streaming system is such that it is possible for the client to keep a continuous playing while going from a segment in some bitrate to the 'next' segment in another bitrate. This way when traffic on the network introduces variations on the rate at which the content is received, the client can react by selecting segments with a bitrate that allows maintaining the client buffer filling to a secure level. Indeed the client usually tries to reach the highest possible bitrate to provide the better viewing quality, and to stay at a level where the rendering does not suffer from late reception of data causing macro-blocks or picture freezes.

In a residential network multiple client devices may carry out HTTP streaming simultaneously. If the bandwidth available on the local network or on the broadband network is not sufficient to support the whole traffic, the client devices compete to obtain their share of available bandwidth. The HTTP streaming algorithms independently run in each device and fail to provide an optimal share of the bandwidth. The following situations may occur. The bandwidth share may be unfair, as one of the video streams uses a high constant bitrate, while another one stays at a low bitrate. Or, oscillations may occur where each device alternatively use high and low bitrate. Sometimes the devices may simultaneously over-react to network conditions they judge unfriendly, resulting in the selection of a very low bit rate for each devices and a large waste of bandwidth. It may occur even when enough bandwidth is available; the TCP mechanisms underlying the HTTP protocol may suffer from the implicit competition of packets reception for each stream, and this produces the same results of either stable unfair situations or permanent oscillations. Such behaviour has a direct impact on the quality of experience for the end user, since the displayed video quality is linked to the used bitrate.

SUMMARY OF THE INVENTION

The present invention attempts to remedy at least some of the concerns connected with the adaptive streaming instability in the prior art, by providing a control of the bandwidth used by each adaptive streaming content.

The present invention concerns a device comprising a first interface to a first network comprising an adaptive streaming server, a second interface to a second network comprising at least one adaptive streaming client device, a stream identifier for detecting at least one streaming content requested by the at least one adaptive streaming client device, the at least one streaming content being available at more than one data rate, a bandwidth manager for selecting a data rate among the more than one data rate, a scheduler for transmitting at the second interface the at least one streaming content to the at least one client device at a data rate above said selected data rate but below any higher data rate available for said streaming content.

According to an embodiment, the first interface has a maximum bandwidth reception, and the data rate is selected so that the bandwidth required for the at least one streaming content is below the maximum bandwidth reception.

According to an embodiment, the bandwidth manager is adapted to prioritize the transmission of the at least one streaming content to the at least one client device.

According to an embodiment, the device is a residential gateway.

Another object of the invention is a method in a device comprising a first interface to a first network comprising an adaptive streaming server, a second interface to a second network comprising at least one adaptive streaming client device. The method comprises the steps of detecting at least one streaming content requested by the at least one adaptive streaming client device, the at least one streaming content being available at more than one data rate, selecting a data rate among the more than one data rate, transmitting at the second interface the at least one streaming content to the at least one client device at a data rate above the selected data rate but below any higher data rate available for the streaming content.

Another object of the invention is a computer program product comprising program code instructions for executing the steps of the method according to the invention, when that program is executed on a computer. By "computer program product", it is meant a computer program support, which may consist not only in a storing space containing the program, such as a computer memory, but also in a signal, such as an electrical or optical signal.

The present invention performs traffic shaping at the level of a device located between the adaptive streaming server and the adaptive streaming client devices. The bandwidth management allows optimal tradeoffs between the number of possible concurrent services and the perceived QoE of each service. The effects of the traffic shaping of the invention are beneficial to the behaviour of each HTTP adaptive streaming clients. This suppresses or limits the competition between several streams.

Without traffic shaping, the share of bandwidth is determined by the properties of the TCP protocol and how the client algorithms react to the bandwidth they 'measure'; in practice, this leads to unstable and/or unfair situations. With traffic shaping, each stream is limited in its possible range of variations. If a stream can go to a high bitrate for example because another stream is temporarily with low traffic, it will then suffer from a coming bandwidth lowering because the high bitrate requested segment take much time to arrive. Then to compensate, the adaptive client will have to go to a very low bitrate to compensate. So the bitrate variations have a large amplitude, leading to poor quality of experience. By limiting the perceived bandwidth to a value close to the average target, the client will never go too high and will be more stable around the target value.

The invention also allows allocating bandwidth in controlled proportions, such as the example of different video formats using different bitrates. Without the central arbitration provided by our gateway, clients will tend to share the bandwidth to similar bitrates.

The classification of the traffic may include priority rules between the audiovisual streams and other kinds of data flows. This allows for example protecting the OTT video viewing from being disturbed by data files downloads.

The home gateway is a good place to do bandwidth management since it has the ability to get appropriate knowledge of the network and devices constraints, and it sees all traffic, and thus should be able to identify the streams belonging to the AV services and take actions on them.

Certain aspects commensurate in scope with the disclosed embodiments are set forth below. It should be understood that these aspects are presented merely to provide the reader with a brief summary of certain forms the invention might take and that these aspects are not intended to limit the scope of the invention. Indeed, the invention may encompass a variety of aspects that may not be set forth below.

BRIEF DESCRIPTION OF THE DRAWINGS

The invention will be better understood and illustrated by means of the following embodiment and execution examples, in no way limitative, with reference to the appended figures on which.

Figure 1:
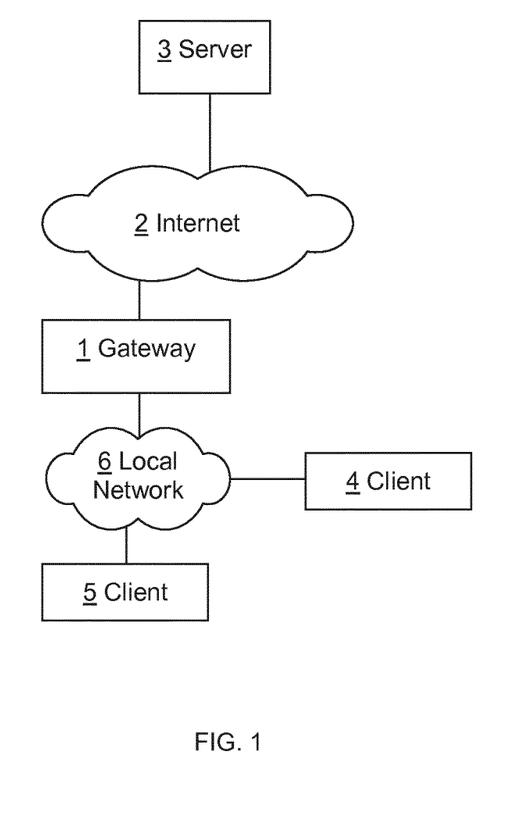
FIG. 1 is a block diagram of a system according to the embodiment.

In FIG. 1, the represented blocks are purely functional entities, which do not necessarily correspond to physically separate entities. Namely, they could be developed in the form of hardware or software, or be implemented in one or several integrated circuits.

DETAILED DESCRIPTION OF PREFERRED EMBODIMENTS

It is to be understood that the figures and descriptions of the present invention have been simplified to illustrate elements that are relevant for a clear understanding of the present invention, while eliminating, for purposes of clarity, many other elements found in typical digital multimedia content delivery methods and systems. However, because such elements are well known in the art, a detailed discussion of such elements is not provided herein. The disclosure herein is directed to all such variations and modifications known to those skilled in the art.

The system according to the embodiment is represented in FIG. 1. It comprises two client devices 4, 5 and a streaming server 3 connected through the Internet 2. The client devices are located in a local network 6 connected to the Internet through a gateway 1. Preferably the local network is a residential network. The server streams chunks to the clients, upon the client request, using HTTP protocol over TCP/IP connection.

Figure 2:
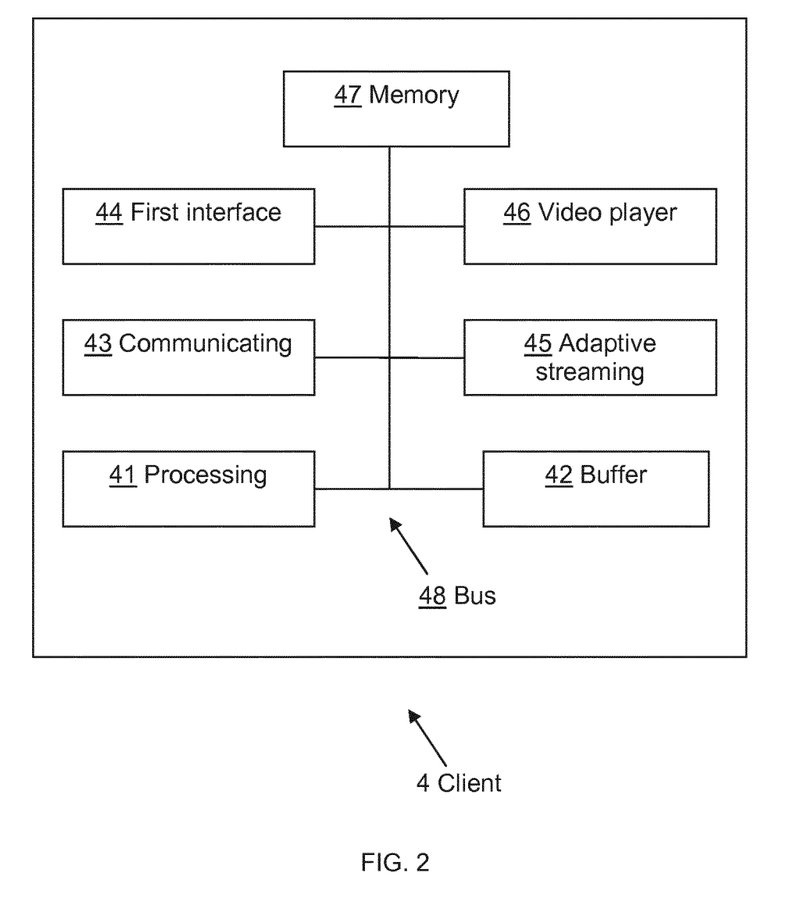
FIG. 2 is a block diagram of a client device according to the embodiment.

A client device 4 according to the embodiment is illustrated in FIG. 2. The client device, also called an adaptive streaming client device hereinafter, comprises a first interface 44 to the local network 6. The client comprises a communicating module 43, which comprises the protocol stacks to communicate to the server 3. In particular the communicating means comprises the TCP/IP stack well known in the art. Of course it could be any other type of network and/or communicating means enabling the client to communicate to the server. It comprises an adaptive streaming module 45. It is an HTTP streaming client that receives HTTP streaming content from the server. It continually selects the chunk at the bit rate that better matches the network constraints and its own constraints.

The client comprises a video player 46 that is adapted to decode and render the content. The client also comprises a processor 41 for executing the applications and programs stored in the client. It comprises storing means 42, such as a memory, for buffering the chunks received from the server before they are transmitted to the video player 46. In particular the memory is a volatile memory. Of course the client comprises a non-volatile memory, not represented, for storing applications and programs running on the client. The client device could be a portable media device or a laptop. Alternatively the client device does not comprise a video player, and comprise an interface to connect a video player. Then the client device is a video decoder such as a set-top box.

Figure 3:
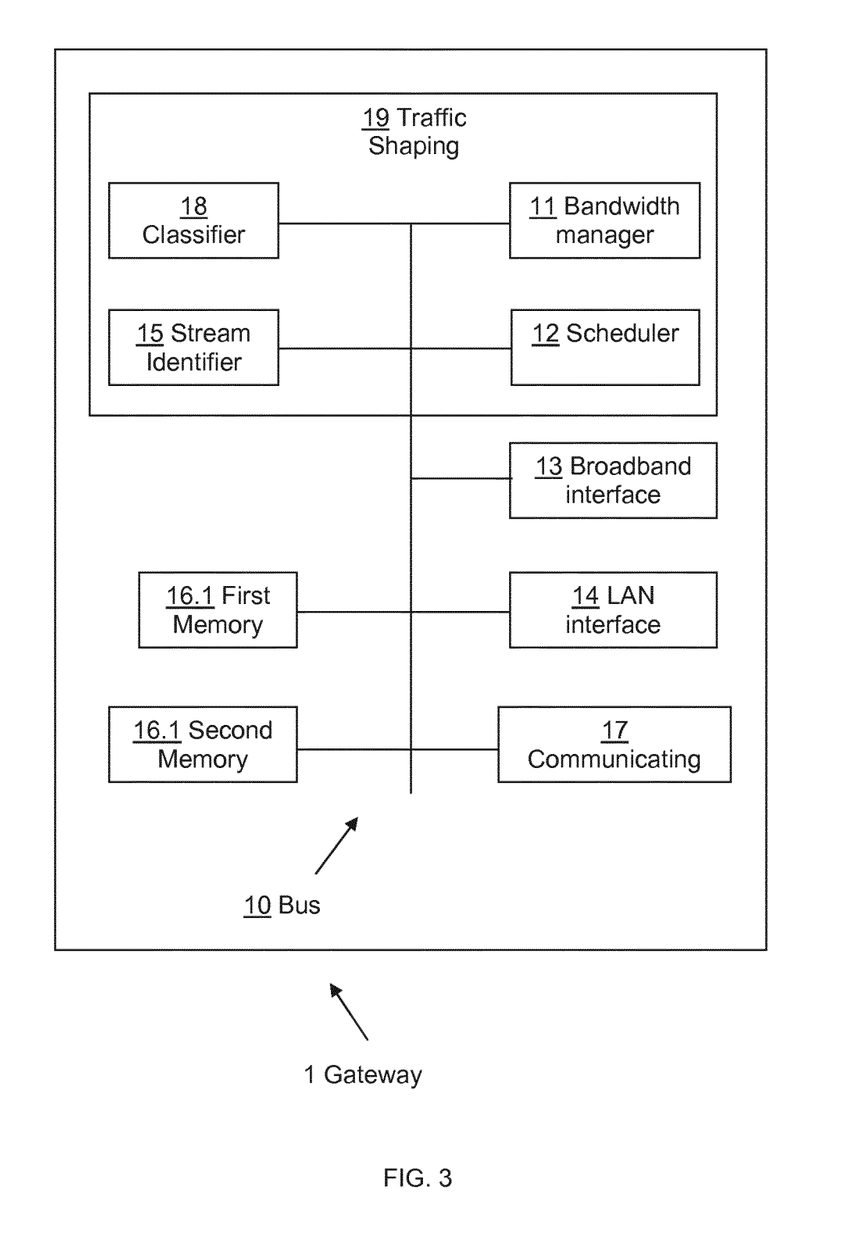
FIG. 3 is a block diagram of a gateway device according to the embodiment.

The gateway according to the embodiment is illustrated in FIG. 3. It is a Digital Subscriber Line gateway that provides Internet broadband access to the residential network through the DSL technology. Of course the gateway could be any type of broadband gateway such as cable, fiber or wireless. It comprises a LAN interface 14, a broadband interface 13 and a communicating module 17 that comprises the protocol stacks to communicate through the interfaces. The communicating module comprises an Internet Protocol stack, noted IP stack.

The gateway comprises a first memory 16.1 and a second memory 16.2. The first memory 16.1 is adapted to store information extracted from the playlist files. The second memory 16.2 is adapted to buffer the packets received from and sent to the interfaces.

The gateway also comprises a traffic shaping module 19 comprising a bandwidth manager 11, a stream identifier module 15, a scheduler 12 and a classifier 18 that are more detailed hereinafter.

The gateway comprises an internal bus 10 to connect the various modules. It also comprises processing means, routing and bridging means not represented, and all means well known to the skilled in the art for performing the generic residential gateway functionalities.

Figure 4:
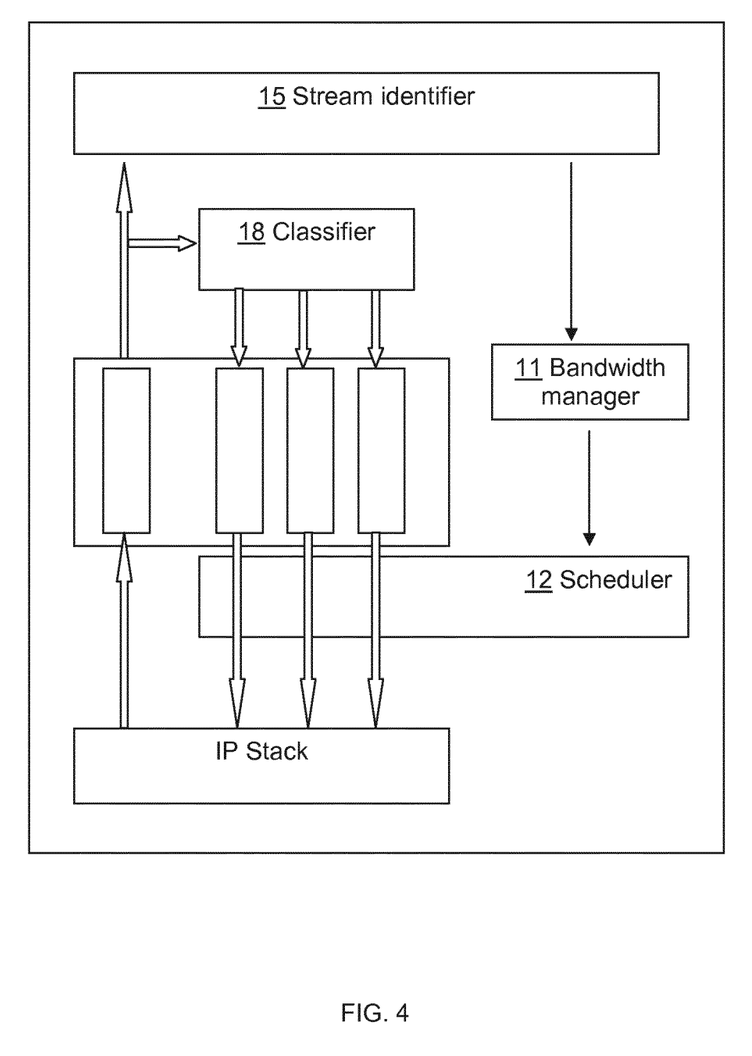
FIG. 4 is another block diagram of a gateway device according to the embodiment.

The gateway is further illustrated in FIG. 4. The stream identifier module 15 is adapted to analyze the streams received at gateway. Each time a client device issues a service request, it identifies this request and collects service information by intercepting the playlist which is returned from the server to the client. It intercepts and analyzes the playlist files destined to each local device. Analyzing a playlist file permits to extract information such as the bit rates announced by the server and the associated segments URLs. To intercept the playlist the stream identifier is aware of the available streaming techniques and on the associated protocols. For each protocol, it knows the type of packet that transports the playlist. In particular it is aware of the Apple HTTP Live Streaming, the Microsoft Smooth Streaming and the Adobe Open Source Media Framework techniques. Of course it can be configured to be made aware of other streaming techniques.

The stream identifier also identifies when a stream is no longer received at the gateway. For example when a stream is not received during a period of time, the stream identifier considers that the session is finished and cancels the distribution to the client device.

Information obtained by the stream identifier 15 is transmitted to the bandwidth manager 11.

The bandwidth manager decides if a service is admitted and allocates to the service a target bit-rate, changing at the same time the targets for other services that may be already running. The bandwidth manager is configured to know the value of the maximum bandwidth available on the broadband interface. Depending on this value, the bandwidth manager then determines the bandwidth distribution among the streams. It configures the second memory, so that for each stream detected, a specific queue is created in the second memory, and a target transmission bitrate is set to each queue. In other words, the playlist provides the bitrates available by the HTTP streaming for each stream. It permits the bandwidth manager to determine precise target bitrates for each stream. After determining the target bitrate for each stream, the bandwidth manager configures the scheduler 12. The scheduler 12 is adapted to manage the transmission of packets in the local network. In other words, each stream is assigned an independent queue that is allocated exactly one precise bandwidth. Packets are sent no faster than this target bitrate. At the same time the bandwidth is 'guaranteed'; as long as the queue has packets to send and does not reach the target bitrate, the packets have priority on other traffic.

The decisions of the bandwidth manager regarding bandwidth allocation among streaming sessions depend on many parameters and user or service provider preferences. They lead to a set of arbitration schemes (e.g. fair sharing wherein all sessions get a bandwidth proportional to their formats) enforced by the bandwidth manager and fed by characteristics of the content, the network, the client devices, etc. The bandwidth manager relies firstly on the intrinsic elasticity of the http adaptive streams together with the ability to know the possible bit-rate steps that are available.

The bandwidth distribution is performed as follows. It is based on the client device type. For example, a stream for a television set has a priority higher than a stream for a portable media player. Alternatively, bandwidth distribution can be based on the location of the client device in the residential network. A client device located in a living room may have a higher priority than a client device located in a bedroom. This distribution is preferable for fixed devices such as a television set, a set-top box. Bandwidth distribution can also be based on the combination of the device type and its location in the residential network. Alternatively, the distribution is equitably set be among the devices.

Preferably, the gateway comprises a user interface that enables adjusting priorities between the streams. Entries in the user interface may be for example the device type, its location and its priority.

As an example embodiment of computing the bandwidth to allocate to the clients, we give hereafter a possible algorithm:

Let BW be the total available bandwidth.

For each client c:
  let share[c] be the percentage of bandwidth we want to give to c. share[c] is determined by management policies, user preferences etc as said above.
  Let target[c] denote the content bitrate that we wish client c to choose.
  target[c] is initialized with the highest value of streaming content for c, and will then be computed below.
  Let percent[c] denote the temporary computed value of how much bandwidth a client uses
Computation of final target E table is done according to the following algorithm:
  While SUM (target[ ])>BW
    Select client c with largest ratio (percent[c]/share [c]), ignoring clients that are already at their lowest rate
    target[c]:=next lower bitrate for c
    percent[c]:=target[c]/BW
  Now we allocate "unused" bandwidth to clients:
  unused:=BW−SUM (target[ ])
  For each client c:
    target[c]:=target[c]+(unused*share[c])
So each client will have its traffic shaped to a value greater than the content bitrate we want to be used. This is a condition for the client to successfully keep requesting the desired content bitrate, since HTTP adaptive clients generally don't succeed in using 100% of the bandwidth they have.

The classifier 18 is adapted to identify the streams received at the gateway, and to route them to the suitable queue in the second memory. Every packet received for one of the devices is checked and identified by the classifier module as belonging to one of the audio-video streams or some other traffic. Based on this classification, the packet is placed in a different queue for sending to the LAN. Packets in each queue are delivered by the scheduler according to the shaping profile chosen. They are forwarded so as to conform to the targeted bitrate.

As soon as target bitrates are chosen for each client, the gateway applies traffic shaping so that the network bandwidth perceived by the client devices leads them to adopt the desired bit-rate. This prevents a device from seeing speed bursts in reception due to possible usage of the whole bandwidth which would make it believe it can try higher bit-rate requests. At the same time, each client is guaranteed a priority for use of its own bandwidth share. This avoids the client seeing bit-rate down peeks and compensating for it.

Some examples now illustrate how the traffic shaping is performed with the device of the embodiment.

In a first example, a stream is available for a client device at 1 mbps, 2 mbps and 3 mbps. The available bandwidth is 2.5 mbps on average. The gateway then selects the 2 mbps. Thereafter, the client device receives the streaming content at a maximum of 2 mbps and will not be conducted to request the content at 3 mbs. This prevents the client device from using more than 2 mbps.

In a second example, a first stream is available for a first client device at 1 mbps, 2 mbps and 3 mbps, and a second stream is available for a second client device at 2 mbps, 3 mbps and 5 mbps. The available bandwidth is 5.5 mbps. Priority has been put on the first client device. The first client device receives the streaming content at a maximum of 3 mbps, and the second client device receives the streaming content at a maximum of 2 mbps. This prevents the second client device from using more than 2 mbps. Later the first client does no longer receive the first stream. As more bandwidth is available, the second client device receives the streaming content at a maximum of 5 mbps.

Another example is when an SD stream and a HD stream are requested. They are allocated bandwidth proportional to their respective maximum bitrate, e.g. 20% for the SD stream and 80% for the HD stream. Preferably, the target bitrate for a queue is placed a few percent over the target bitrate of the stream to ensure that the client can stabilize its choice to the targeted variant of the stream.

In the embodiment, the bandwidth manager determines the bandwidth distribution among the streams, based on the value of the maximum bandwidth available on the broadband interface. Alternatively, instead of the maximum bandwidth available on the broadband interface, the bandwidth manager could take into account the maximum bandwidth available on the local network. it would then determine the bandwidth distribution among the streams, based on the value of the maximum bandwidth available on the local network. This occurs if the bottleneck is at the local network instead of the broadband network.

In the embodiment, traffic shaping is performed at the gateway. Alternatively it could be performed in a router located in the local network, and connected to the gateway.

References disclosed in the description, the claims and the drawings may be provided independently or in any appropriate combination. Features may, where appropriate, be implemented in hardware, software, or a combination of the two.

Reference herein to "one embodiment" or "an embodiment" means that a particular feature, structure, or characteristic described in connection with the embodiment can be included in at least one implementation of the invention. The appearances of the phrase "in one embodiment" in various places in the specification are not necessarily all referring to the same embodiment, nor are separate or alternative embodiments necessarily mutually exclusive of other embodiments.

Reference numerals appearing in the claims are by way of illustration only and shall have no limiting effect on the scope of the claims.

The invention claimed is:
1. A gateway device comprising:
   a first network interface to a first network, said first network comprising an adaptive streaming server;
   a second network interface to a second network, said second network comprising at least one adaptive streaming client device;
   a processor configured to detect at least one streaming content requested by said at least one adaptive streaming client device to said adaptive streaming server, said at least one streaming content being encoded at more than one bit-rate at said adaptive streaming server;
   the processor being further configured to select a bit-rate among the more than one bit-rate based on detected currently received streams;
   the processor being further configured to determine a transmission data rate for traffic shaping while transmitting said at least one streaming content received from said adaptive streaming server, at said second interface to said at least one adaptive streaming client device, said transmission data rate being above the selected bitrate but below any higher bit-rate of the more than one bit-rate; and
   the processor being further configured, on reception of said at least one streaming content from said adaptive streaming server at a data rate above said transmission data rate, to transmit said at least one streaming content at said second interface to said at least one client device as received from said adaptive streaming server but shaped according to at-said transmission data rate.

2. The device according to claim 1, said processor being further configured to prioritize the transmission of said at least one streaming content to said at least one client device.

3. The device according to claim 1, said processor being further configured to select said data rate according to other streaming content transmitted on said second network.

4. The device according to claim 1, said second network interface being an interface to a local network.

5. The device according to claim 1, said first network interface being a broadband interface.

6. The device according to claim 1, said processor being further configured to prioritize based on the client device type.

7. A method performed by a device comprising a first interface to a first network, said first network comprising an adaptive streaming server, and a second interface to a second network, said second network comprising at least one adaptive streaming client device, said method comprising:
  detecting at least one streaming content requested by said at least one adaptive streaming client device to said adaptive streaming server, said at least one streaming content being encoded at more than one bit-rate at said adaptive streaming server,
  selecting a bit-rate among the more than one bit-rate based on detected currently received streams;
  determining a transmission data rate for traffic shaping while transmitting said at least one streaming content received from said adaptive streaming server, at said second interface to said at least one adaptive streaming client device, said transmission data rate being above the selected bit-rate but below any higher bitrate of the more than one bit-rate;
  on reception of said at least one streaming content from said adaptive streaming server at a data rate above said transmission data rate, transmitting said at least one streaming content at said second interface to said at least one client device as received from said adaptive streaming server but shaped according to said selected transmission data rate.

8. The method according to claim 7, comprising prioritizing the transmission of said at least one streaming content to said at least one client device.

9. A program storage device, readable by a computer, tangibly embodying a program of instructions executable by the computer to perform a method performed by a device comprising a first interface to a first network, said first network comprising an adaptive streaming server, and a second interface to a second network, said second network comprising at least one adaptive streaming client device, the method comprising:
  detecting at least one streaming content requested by said at least one adaptive streaming client device to said adaptive streaming server, said at least one streaming content being encoded at more than one bit-rate at said adaptive streaming server,
  selecting a bit-rate among the more than one bit-rate based on detected currently received streams;
  determining a transmission data rate for traffic shaping while transmitting said at least one streaming content received from said adaptive streaming server, at said second interface to said at least one adaptive streaming client, said transmission data rate being above the selected bit-rate but below any higher bitrate of the more than one bit-rate;
  on reception of said at least one streaming content from said adaptive streaming server at a data rate above said transmission data rate, transmitting said at least one streaming content at said second interface to said at least one client device as received from said adaptive streaming server but shaped according to said selected transmission data rate.

* * * * *